Sept. 14, 1954

A. J. HORNFECK 2,689,088

CONTROL SYSTEM

Original filed June 29, 1945

INVENTOR.
ANTHONY J. HORNFECK
BY
Raymond W. Junkins
ATTORNEY

Sept. 14, 1954  A. J. HORNFECK  2,689,088
CONTROL SYSTEM
Original Filed June 29, 1945  3 Sheets-Sheet 2
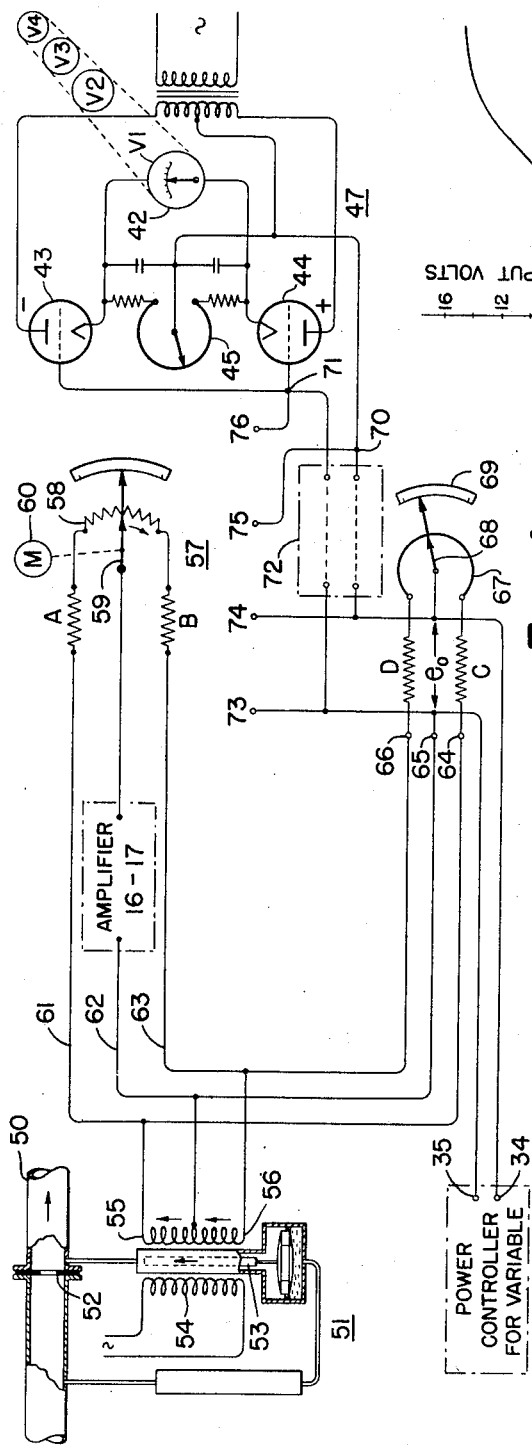
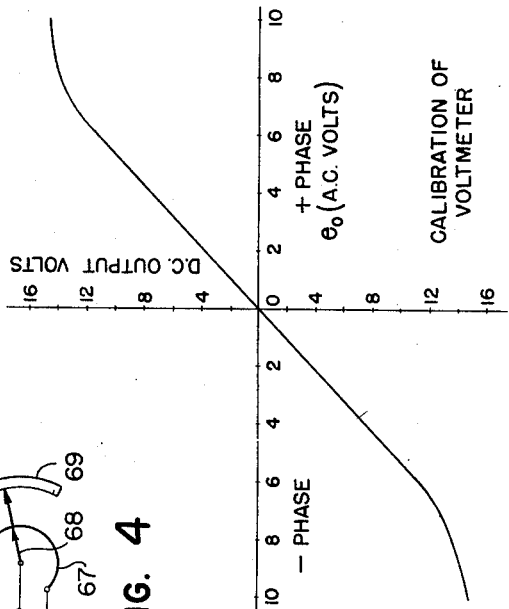
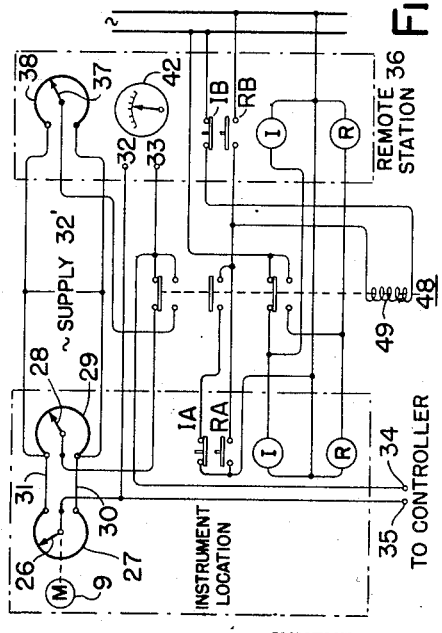
INVENTOR.
ANTHONY J. HORNFECK
BY Raymond W. Junkins
ATTORNEY Patented Sept. 14, 1954

2,689,088

UNITED STATES PATENT OFFICE 2,689,088

CONTROL SYSTEM

Anthony J. Hornfeck, Lyndhurst, Ohio, assignor to Bailey Meter Company, a corporation of Delaware Original application June 29, 1945, Serial No. 602,334. Divided and this application November 1, 1950, Serial No. 193,495

5 Claims. (Cl. 236—15)

1

The present invention relates to measuring and/or control systems, particularly of the electronic circuit type. A variable condition, quantity, position or other value which may be represented by an electrical resistance value may be continuously and instantaneously measured through the agency of the circuit to be described. The measurement so obtained may be used to effect a control of the same or of another variable which may or may not contribute to the magnitude or change in magnitude of the variable being measured.

Specifically, my present invention provides improvements in an electronic control circuit allowing the control standard to be set at more than one physical location without interfering with the measurement or control and allowing observation of the actual value of the variable as well as its relation to the desired standard value at more than one physical location.

I have chosen to illustrate and describe my invention in connection with three basic electronic measuring circuits representative only and not limited thereto. In general, I describe my invention in connection with a phase sensitive alternating current bridge network including a resistance thermometer. A second embodiment is in connection with a movable core transformer telemetering circuit. The third embodiment is in connection with a thermocouple type of temperature measuring instrument. I have chosen these as representative only and by way of example.

In the drawings:

Fig. 2 is a graph of circuit values for a voltage discrimination indicator.

Fig. 3 is a portion of a circuit applicable to the general arrangement of Figs. 1, 4 and 5.

Fig. 4 is a measuring and control system applied to a telemetric flow meter.

Figure 1:
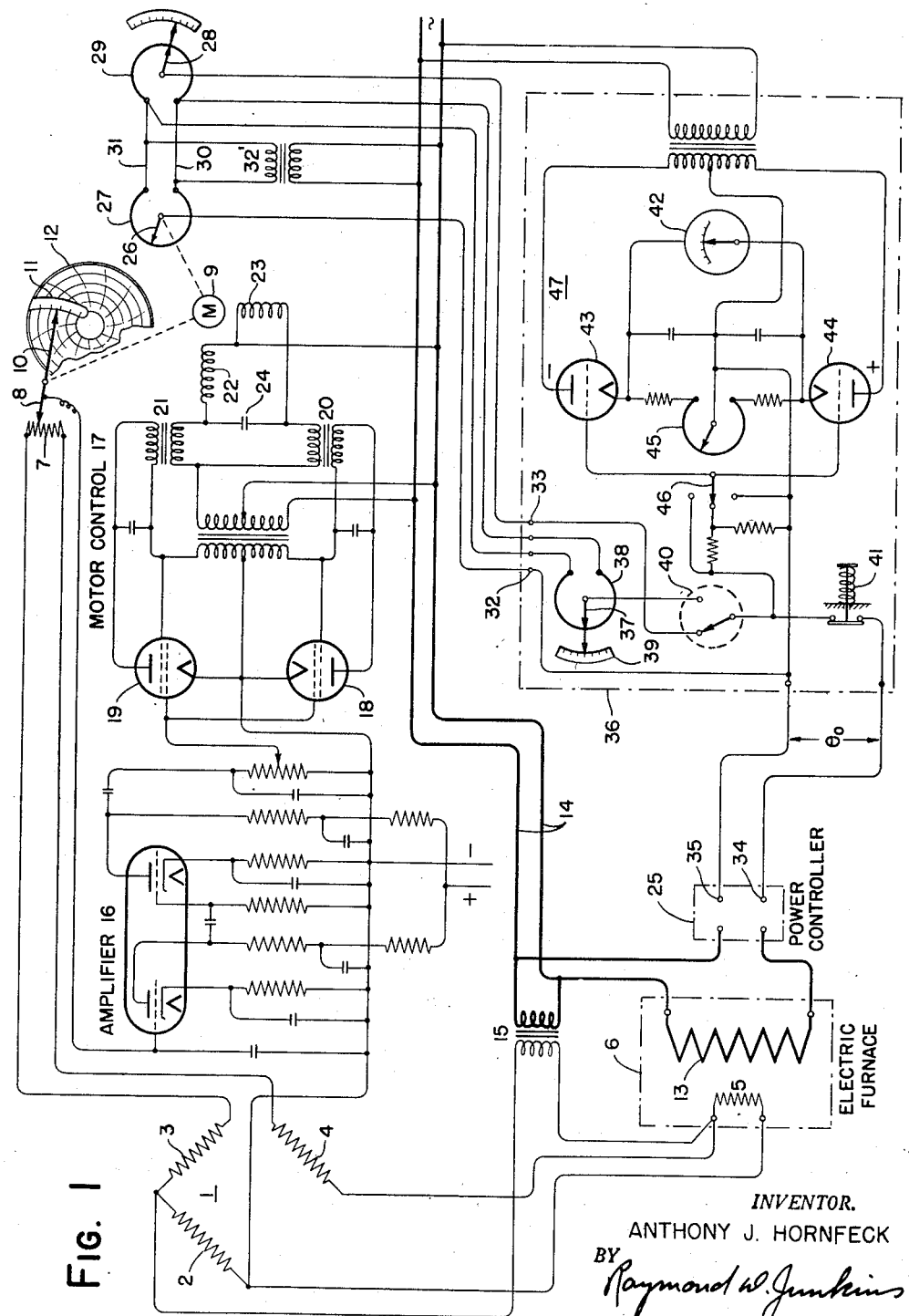
Fig. 1 is a measuring and control system in connection with a resistance thermometer.

All of the figures of the drawing are shown in quite diagrammatic or schematic manner. In Fig. 1 I have shown the amplifier and motor control circuit in detail. I have not felt it necessary to duplicate such detail in Figs. 4 and 5 and have therein indicated the amplifier and motor control circuits merely as blocks. The showing of Fig. 3 is of push button and signal light means applicable to the general embodiments to allow the operator at either the instrument or at the remote station to assume control of the system and to indicate where such control is placed.

2

Referring now in particular to Fig. 1, I indicate at 1 a phase sensitive alternating current bridge having fixed resistor arms 2, 3 and 4. The fourth arm 5 of the bridge 1 is a resistance element located in an electric furnace 6 and sensitive to the temperature thereof. For balancing the network I provide an adjustable resistance 7 inserted between the arms 3 and 4 and provided with a movable contact arm 8 for proportioning the resistance 7 between the arms 3 and 4.

For positioning the contact arm 8 I provide a motor 9 which also positions an indicator 10 relative to a scale 11 and relative to a revoluble chart 12, thereby providing an instantaneous indication as well as a continuous record of the value of temperature to which the resistance arm 5 is sensitive.

The electric furnace 6 is preferably heated by electric resistance elements 13 receiving current from an alternating current source 14 which also provides alternating current supply to the bridge 1 through a transformer 15.

Preferably the bridge arm 5 is a platinum resistance measuring element. The conjugate corners of the bridge 1 are connected to an amplifier 16 and motor control 17 for the motor 9. For an understanding of a phase sensitive alternating current bridge for measuring the resistance of the leg 5 subjected to temperature of the furnace 6 reference may be had to the Ryder Patents 2,275,317 and 2,333,393. The conjugate voltage supplied to the amplifier 16 assumes a balance or unbalance and a phase relation relative to the supply voltage dependent upon the magnitude and sense of the unbalanced condition of the bridge. The amplifier 16 selectively controls motor tubes 18, 19. The tubes 18, 19 control the amount and direction of unbalance of saturable core reactors 20, 21 for directional and speed control of a capacitor-run motor 9 adapted to position the arms 8, 10.

The motor 9 is of an alternating current type having windings 22 and 23 ninety electrical degrees apart and also having a capacitor 24. When alternating current flows directly through one of the windings and simultaneously through the other winding in series with the capacitor the motor rotates in predetermined direction and at a speed determined by the extent of unbalance of the saturable core reactors 20, 21. It is not necessary to go into greater detail as to the construction and operation of the amplifier 16 and the motor control circuit 17, as reference may be had to the above mentioned Ryder patents.

In my present invention, in addition to providing an instantaneous indication and a continuous record of the value of temperature to which the arm 5 is subjected, I provide an electrical control of the heat input of the resistor 13 to an electric furnace 6. I have shown in this connection a power controller 25 which forms no part of the present invention. This may be a General Electric Reactrol or any other adaptable power controller for the resistor 13. My invention applies to the power controller 25 the establishment of an electrical value $e_0$ bearing a desired relation to the temperature to which the arm 5 is subjected, or to the deviation in such temperature from a standard or desired value.

The motor 9, positioning the contact arm 8, simultaneously positions a contact arm 26 over a slide wire 27. At 28 I indicate a contact arm adapted to be manually positioned along a slide wire 29 for establishing the temperature standard to which the control works, i. e. the temperature value which is desirably maintained at the arm 5.

The parts 26, 27, 28 and 29 are included in a phase discriminatory circuit, including the joining conductors 30, 31. This circuit is supplied with alternating current power through a transformer 32' connected across the source 14. The contact arm 26 is positioned relative the slide wire 27 by the motor 9 representative of actual temperature to which the resistance arm 5 is sensitive. The contact arm 28 is positioned relative the slide wire 29 manually to a point representing the desired temperature. The phase discriminatory circuit including these elements then establishes a signal $e_0$ across the terminals 32, 33 and 34, 35 of reversible phase and having a magnitude proportional to the unbalance of the control circuit.

The operation is as follows. If temperature within the furnace 6 deviates from the desired value, then the resistance of the bridge arm 5 changes, causing an unbalance of the bridge 1 in one direction or the other dependent upon whether the actual temperature is above or below the desired temperature. The phase and magnitude of the A.-C. output of the bridge 1 follows the sense and amount of unbalance of the bridge and is applied to the amplifier 16 for control of the motor 9. The motor 9 rotates in predetermined direction and amount determined by the phase and amount of unbalance of the bridge 1 and positions the contact 8 along the slide wire 7 in proper direction to rebalance the bridge. The amount of movement of the contact 8 over the slide wire 7 to bring about such a rebalancing is representative of the deviation of the actual temperature from the desired temperature, and therefore the indicator 10 continuously shows on the index 11 and chart 12 the actual temperature of the furnace.

At the same time the motor 9 has positioned the contact 26 along the slide wire 27 in consonance with the departure of the temperature from the desired temperature. With such movement of the contact arm 26 the phase discriminatory circuit including the elements 26, 27, 28, 29, 30 and 31 becomes unbalanced and an electrical value is established across the terminals 32, 33 representative of the direction and extent of such unbalance. Such signal is simultaneously effective at the terminals 34, 35 controlling the power input to the resistor 13 in proper amount and direction to return the temperature of the furnace to the desired standard.

As the temperature (due to a change in heating of the resistor 13) returns toward desired value the consequent temperature change at the resistor 5 unbalances the bridge 1 and causes the motor 9 to position the contacts 8 and 26 in proper direction and amount until the bridge 1 and the control bridge are again balanced. It is appreciated, of course, that this action may be more or less continuous, i. e. before the temperature returns completely to its desired standard there may be other influences acting upon the furnace to prevent or to accelerate the return of the temperature to the desired value. In other words, the measuring circuit is continually indicating the instantaneous temperature of the furnace and the control circuit is continuously regulating the power controller 25 to maintain the temperature at the desired value or standard.

It is customary for an instrument, such as a recorder-controller, to contain the elements of the bridge 1 (except the resistance 5), the amplifier, the motor control, the motor 9, the recording measuring elements, and the control bridge. The slide 26 is positioned by the motor 9 relative to the slide wire 27 simultaneously with a positioning of the elements 8 and 10. In other words all elements of Fig. 1 above the power lines 14. The hand adjusted slide 28 is usually provided with a knob and given ready access to the operator at the measuring controlling instrument. Such instrument may be located adjacent the furnace 6.

It is frequently desired to have means provided at another or remote station wherein the control standard may be there adjusted and with provision for indicating at such remote location whether or not the temperature is being controlled to the desired standard value. At 36 I show by dotted enclosure such a remote station including a second standard setter comprising a manually positionable contact arm 37 along a slide wire 38 and having a scale 39 to show what temperature standard the elements 37, 38 are adjusted to. The slide wire 38 is connected across the conductors 30, 31 in parallel with the slide wire 29.

As shown in Fig. 1 a two-position switch 40 allows the control terminal 34 to be selectively connected with either the contact 28 or the contact 37. As shown, it is connected to the contact 28 and therefore the phase discriminatory circuit includes the elements 28, 29 and does not include the element 37. If, at the remote location 36 the operator desires to change the temperature standard to which the power controller 25 operates he would move the arm of the switch 40 to the alternate position connecting the terminal 34 with the contact 37 and while doing this would hold depressed the push button 41 to open the circuit to the power controller momentarily while the switch-over is made.

If the power controller 25 draws current from the control bridge, the output or unbalance voltage will be reduced. Under this condition the deflection of the deviation indicator will not be an accurate function of temperature deviation from the control setting. If a more accurate reading is desired the controller can be momentarily disconnected by depressing the push button 41. Thereafter the operator might turn the knob of contact 37 until the index 39 showed the new temperature standard he desires to maintain in the furnace and so long as the switch 40 connects the arm 37 with the terminal 34 the furnace would be controlled to the standard set on the indicator 39 with the elements 26, 27, 30, 31, 37 and 38 comprising the phase discriminatory circuit.

Under the conditions just described where control of the standard is at the remote station, there is available at the measuring instrument a continuous indication of the actual temperature (10, 11, 12), but no indication as to what standard is being used for the control because the elements 28, 29 are not in circuit. At the remote location the position of the switch 40 shows that the remote standard is being used and the position of the arm 37 relative to the scale 39 shows the value of the standard. I will now describe means within the remote station 36 for showing at that location a deviation of temperature from the standard value and thereby, in conjunction with the scale 39, an indication of the actual temperature of the furnace. Such means is a cathode follower circuit 47 unique in that I use alternating current on the plates. Such circuit includes a zero center scale direct current voltmeter 42 under the control of tubes 43, 44. The variable resistance 45 provides a zero adjustment for the voltmeter 42, while the switch arm 46 allows a selective change in range of the voltmeter.

The cathode follower circuit 47 is connected in parallel across the terminals 34, 35 and is thus sensitive to the phase and magnitude of the signal applied to the power controller 25. If the signal $e_0$ is of plus phase alternating current voltage the needle of the voltmeter 42 will swing to one side of its center zero. If the signal is of minus phase the needle will swing to a position the other side of its center zero. The amount of such swing away from zero is determined by the magnitude of the signal $e_0$ and in conjunction with the range of the voltmeter 42 then in use as determined by the position of the arm 46 selectively between several possible ranges.

In Fig. 2 I show an actual calibration curve of such a zero center scale direct current voltmeter and it will be observed that the motion is substantially linear throughout a major portion of the deviation each way from center zero. It will also be noted that the circuit 47 provides an amplification of approximately two in that the D.-C. volt output applied to the instrument 42 is approximately twice the value of $e_0$ in alternating current voltage.

It will be observed that the circuit 47 and instrument 42 are effectively in circuit irrespective as to whether the elements 28, 29 or the elements 37, 38 are in use (connected in circuit) as a desired standard setting.

Referring now to Fig. 3, I show therein devices and circuits which may be superimposed upon the arrangement of Fig. 1 if desired. Inasmuch as this circuit and device are applicable to the arrangements of Figs. 1, 4 and 5 I have shown it as a separate figure which may be superimposed upon any one of the other three mentioned.

At the instrument location I show instantaneous push buttons IA and RA as well as indicating lights I and R. At the remote station 36 I show instantaneous push buttons IB and RB as well as signal lights I and R. Interconnecting the push buttons and signal lights is a relay 48 having a solenoid winding 49. In Fig. 3 the relay 48 is shown in deenergized position corresponding to a use of the standard setter 28, 29 in the instrument location. By following the circuit through it will be seen that lights I (representing instrument location) are energized, that contact 28 is connected to terminal 33 and contact 37 is not so connected. Thus at both the instrument location and at the remote station the signal lights (I) indicate that control is at the instrument location under standard setter 28, 29 and the discrimination voltmeter 42 shows, at the remote station 36, the departure, if any, of temperature in one direction or the other from the standard.

If it is desired to make the standard setting for control available at the remote station by disconnecting contact 28 and connecting in the contact 37 and slide wire 38, then the instantaneous push button RA or the push button RB is momentarily depressed, thus energizing the coil 49 which is thereafter locked in through the push buttons IA and IB. The signal lights (I) go out and the signal lights R are lighted, denoting that control is at the remote station. Thereafter control may be returned to the instrument by momentarily depressing either IA or IB which breaks the lock on coil 49 allowing it to become deenergized to the condition as shown in Fig. 3.

Thus I provide at either the instrument location or at the remote station signal lights which will show whether the control is under the standard control of elements 28, 29 or of elements 37, 38 while the deviation indicator 42 indicates at the remote location whether or not the desired standard (manually adjusted by 37, 38) is being attained.

In Fig. 4 I show an adaptation of my invention to a telemetering circuit including a movable core transformer. Such a circuit is disclosed and claimed in my copending application Serial No. 569,479, now Patent 2,439,891, to which reference may be had. I illustrate the measuring of the rate of flow of a fluid through a conduit 50 by a flow meter 51 sensitive to pressure differentials existing across an orifice 52 inserted in the pipe line 50. The flow meter 51 is of a conventional U-tube type, the mercury level in one leg adapted to vertically position a core 53 relative to fixed windings 54, 55 and 56. Winding 54 is continuously energized across an alternating current source. Windings 55 and 56 are secondary windings receiving alternating current inductively from the primary 54 and the whole comprising a movable core transformer.

The secondary windings 55, 56 are in loop circuit with fixed resistances A and B of a receiver 57 having a slide wire 58 over which is positioned a movable contact 59 by a motor 60. Unbalance of the circuit, due to a movement of the core 53, is effective upon the amplifier 16 and motor control 17 for operating the motor 60 in proper direction and amount to move the contact 59 along the slide wire 58 and rebalance the circuit. The receiver 57 for indicating and/or recording, i. e. measuring the rate of fluid flow or differential pressure, may be located adjacent the meter 51 or remote therefrom.

In Fig. 4 I adapt such a telemetering circuit to the control of the same or another variable from the continuous measurement of fluid flow through the orifice 52. In other words, the control impulse or signal of reversing phase and voltage magnitude may be used in a control of the rate of fluid flow through the conduit 50 or may be used in the control of some other variable in the same or another process.

The network conductors 61, 62 and 63 are connected to terminals 64, 65 and 66 respectively of a control circuit including resistors C and D and slide wire 67. Thus the circuit elements C, D and 67 parallel the elements A, B and 58 across the windings 55, 56. The contact 68 is manually positioned along the slide wire 67 relative the scale 69 to establish the standard or value to which the control is to work. The signal value $e_0$ between the terminal 65 and the contact 68 is then effective at the terminals 34, 35 of a power controller for controlling any variable as desired.

At the same time the signal $e_0$ is effective at terminals 70, 71 entering the cathode follower circuit 47 for the center zero scale D.-C. voltmeter 42, otherwise designated as V1. Here, as previously described, the voltmeter 42 shows direction and amount of deviation of the actual rate of fluid flow as compared to the control standard established by the contact 68 along the slide wire 67. If desired additional voltmeters V2, V3, V4 may be connected across the terminals of the voltmeter V1 and located at different locations. With a low energy circuit it may require further amplification ahead of the phase discriminatory circuit as indicated by the box 72. Terminals 73, 74 indicate the possibility of utilizing the signal $e_0$ for other power controllers or other phase discriminatory circuits. Likewise the terminals 75, 76 may be used following amplification 72.

Figure 5:
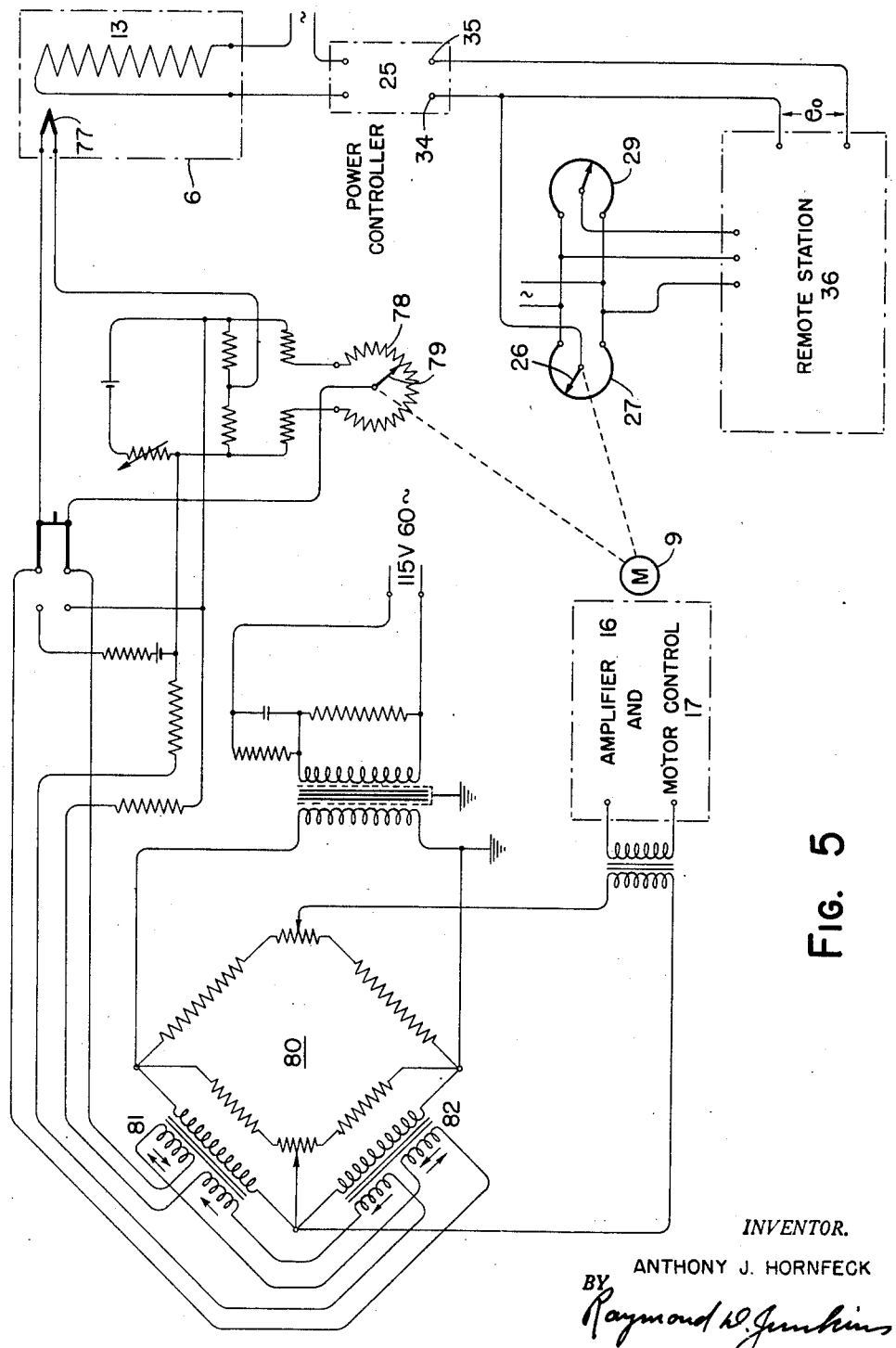
Fig. 5 is a measuring and control circuit applied to a thermocouple temperature measurement.

In Fig. 5 I illustrate an adaptation of my invention to a thermocouple potentiometer circuit, such as is in general disclosed in my copending application Serial No. 544,586, now Patent No. 2,447,338. Located within the furnace 6 is a thermocouple 77 forming a part of a potentiometer circuit having a balancing slide wire 78 and contact 79, the latter positionable by the motor 9. The low level direct current signal in sense and magnitude determined by unbalance of the measuring circuit is applied to an alternating current bridge 80 having saturable core reactors 81, 82 converting the low level D.-C. into reversible phase alternating current signals capable of unbalancing the bridge 80 in one direction or the other when temperature to which the thermocouple 77 is sensitive departs from standard value.

The phase bridge 80 has its output connected to the amplifier 16 and motor control 17 for control of the motor 9 in predetermined direction and speed for positioning the contact 79 along the slide wire 78 to rebalance the measuring circuit. Simultaneously the motor 9 positions the contact 26 relative to the slide wire 27 of the circuit as previously described for establishing a control signal $e_0$ effective at the terminals 34, 35 of the power controller 25 controlling the heating of the resistor elements 13 of the furnace 6.

It will thus be apparent that my invention is applicable to various types of measuring and controlling networks, of which I have described resistance thermometer, telemetering, and thermocouple circuits as by way of example. Other adaptations and advantages of the invention will be evident to those skilled in the art.

This application is a division of my copending application S. N. 602,334 filed June 29, 1945, now Patent 2,557,224.

What I claim as new, and desire to secure by Letters Patent of the United States, is:

1. The combination with a condition measuring network having means responsive to unbalance thereof to rebalance the same, a source of power and a translating means for energization by the power to re-establish a predetermined normal condition, of control means to regulate the amount of power supplied to said translating means, said control means being actuated by changes of phase and potential applied thereto, a phase discriminatory bridge having a source of alternating current and including a balancing slidewire, a contact on said wire arranged to be actuated by said rebalancing means, a connection from said contact to said control means to provide said change of phase and potential, and a manually adjustable potentiometer paralleling the slidewire in said bridge to set the value of the predetermined condition, and means to indicate the phase and potential applied to said control means comprising a cathode follower circuit having a pair of A.-C. energized triodes and a zero center D.-C. voltmeter.

2. The combination with a resistance-measuring bridge having means responsive to unbalance thereof to rebalance the same, a source of power and a translating means for energization from the power source to re-establish a predetermined condition of resistance, of control means to regulate the amount of power supplied to said translating means, said control means being sensitive to changes of phase and potential applied thereto, a phase discriminatory bridge having a source of power and including a pair of balancing slidewires, a contact on one of said wires arranged to be actuated in unison with said rebalancing means, a manually adjustable contact on the other wire for fixing the value of said predetermined condition, conductors from said contacts to said control means to provide said change of phase and potential, and means to indicate the phase and potential applied to said control means comprising a cathode follower circuit having a pair of A.-C. energized triodes and a zero center D.-C. voltmeter.

3. The combination with an electric furnace, a resistance thermometer including a resistance-measuring bridge having means responsive to unbalance thereof to rebalance the same, a source of power for the furnace and a heating means for energization by the power to re-establish a normal condition of temperature and hence of resistance, of control means to regulate the amount of power supplied to said heating means, said control means being responsive to changes of phase and potential applied thereto, an alternating current energized phase discriminatory bridge including two balancing slidewires, a contact on each of said wires, one of said contacts being arranged to be actuated by said rebalancing means, the other contact being manually adjustable to establish said normal temperature, connections from said contacts to said control means to provide said change of phase and potential, and means to indicate the phase and potential applied to said control means comprising a cathode follower circuit having a pair of A.-C. energized triodes and a zero-center D.-C. voltmeter.

4. The combination with an electric furnace, a temperature measuring thermocouple, potentiometer circuit including a balancing resistor, means responsive to unbalance of said circuit to rebalance the same, a source of power and a heating means for energization by the power to reestablish a normal condition of temperature and hence of resistance, of control means to regulate the amount of power supplied to heating means, said control means being sensitive to changes of phase and potential applied thereto, means under the control of said rebalancing means to apply alternating current of the necessary potential and phase to said control means to return the temperature to normal when a deviation occurs, a circuit for measuring said phase and potential including a zero center direct current voltmeter, and a pair of triodes connected in opposition for alternating current energization, the grids of both triodes having a common connection to the said source of phase and potential, said meter being connected to read the cathode current of the tube passing current because of the proper phasing of its grid and anode.

5. A control system for a condition including in combination, a measuring network with means sensitive to the condition and means responsive to network unbalance to rebalance the same, a source of power and a translating means for energization by the power to change the condition, control means for the power source responsive to the phase and potential of alternating current, a phase discriminatory bridge having an alternating current source and including two parallel balancing potentiometers one of which is actuated by the rebalancing means and one of which is manually adjustable, connections between the bridge and the control means to render it responsive to phase and potential of alternating current, and an indicating circuit for the phase and potential of the bridge alternating current including: a pair of triodes connected in opposition, connections for imposing the alternating current potential across the grid-cathode circuit, and an indicator sensitive to the cathode current of the triode passing current.

References Cited in the file of this patent

UNITED STATES PATENTS

| Number | Name | Date |
|---|---|---|
| 2,025,542 | Lugar | Dec. 24, 1935 |
| 2,246,686 | Jones | June 24, 1941 |
| 2,275,317 | Ryder | Mar. 3, 1942 |
| 2,325,308 | Davis | July 27, 1943 |
| 2,364,998 | Palmer | Dec. 12, 1944 |
| 2,426,497 | Field | Aug. 26, 1947 |